(12) United States Patent
Wu

(10) Patent No.: US 7,957,922 B2
(45) Date of Patent: Jun. 7, 2011

(54) DATA LOGGER SYSTEM

(76) Inventor: Fred Wu, Pleasanton, CA (US)

( * ) Notice: Subject to any disclaimer, the term of this patent is extended or adjusted under 35 U.S.C. 154(b) by 0 days.

(21) Appl. No.: 11/892,687

(22) Filed: Aug. 27, 2007

(65) Prior Publication Data

US 2009/0063069 A1 Mar. 5, 2009

(51) Int. Cl.
*G06F 17/40* (2006.01)

(52) U.S. Cl. ............... 702/65; 702/22; 702/24; 702/68; 702/127; 702/187

(58) Field of Classification Search .................. 702/65, 702/68, 127, 22, 24, 187
See application file for complete search history.

(56) References Cited

U.S. PATENT DOCUMENTS

| | | | | |
|---|---|---|---|---|
| 5,479,359 A | * | 12/1995 | Rogero et al. ................. 702/24 |
| 5,591,974 A | * | 1/1997 | Troyer et al. ............... 250/336.1 |
| 5,803,357 A | * | 9/1998 | Lakin .......................... 236/78 B |
| 6,088,514 A | | 7/2000 | Foreman et al. |
| 6,598,003 B1 | * | 7/2003 | Heino et al. ..................... 702/68 |
| 7,130,757 B2 | * | 10/2006 | Corwin et al. ................. 702/127 |
| 2002/0009119 A1 | * | 1/2002 | Matthew et al. ................ 374/45 |
| 2004/0266480 A1 | * | 12/2004 | Hjelt et al. ..................... 455/558 |
| 2005/0131652 A1 | * | 6/2005 | Corwin et al. ................ 702/127 |
| 2005/0140510 A1 | * | 6/2005 | Elwood et al. ................ 340/540 |
| 2007/0093982 A1 | * | 4/2007 | Corwin et al. ................ 702/127 |
| 2008/0146890 A1 | * | 6/2008 | LeBoeuf et al. .............. 600/300 |
| 2008/0146892 A1 | * | 6/2008 | LeBoeuf et al. .............. 600/300 |

* cited by examiner

*Primary Examiner* — Carol S Tsai
(74) *Attorney, Agent, or Firm* — Theodore J. Bielen, Jr

(57) ABSTRACT

A data logger system utilizing a censor which obtain a plurality of measurements of an environmental parameter and generates a plurality of signals representing such measurements. A processor receives the plurality of signals and produces a table of counts in sequential format. An external prime converter receives the table of sequential counts and converts the same to human readable values representing the environmental parameter measurement.

6 Claims, 3 Drawing Sheets

DATA LOGGER SYSTEM

BACKGROUND OF THE INVENTION

The present invention relates to a novel and useful data logger system. Data loggers are often used to measure environmental parameters such as temperatures, humidity, pressure, and the like in association with commodities which are being transported via rail, truck, boat, or by air. In the past, data loggers have been used for generating signals dependant on the sensing of a particular environmental parameter. In addition, prior data loggers have also included memory storage in order to convert parameter sensor readings into values which are readable by a human, i.e., temperature in degrees Fahrenheit, humidity in a percentage, and the like. Unfortunately, this latter function of prior art data loggers utilizes a significant amount of memory which slows the processing of data by the same. In addition, calibration of the data logger is also slowed, as well as other processing tasks. For example, U.S. Pat. No. 6,088,514 describes this type of prior art data logger.

A data logger which is capable of sensing an environmental parameter in conjunction with an external prime converter would be a notable advance in the field of tracking and monitoring goods in transit.

BRIEF SUMMARY OF THE INVENTION

In accordance with the present invention a novel and useful system for gathering and presenting environmental data is herein provided.

The system of the present invention utilizes a sensor which obtains a plurality of measurements of an environmental parameter, such as temperature, humidity, pressure, and the like. The sensor generates a plurality of signals which are representative of such measurements. In certain cases, the plurality of sensor signals may comprise values of electrical resistant, capacitance, voltage, and the like.

A processor is also utilized in the present invention which receives the plurality of signals from the sensor. The processor produces a plurality of counts in this regard. The plurality of counts are stored and then used to produce a table of sequential counts. An analog-to-digital converter receives the plurality of sensor signals and may be formed as part of a microprocessor control unit. In addition, A processor is employed and may include an electronic erasable programmable read only memory unit (EEPROM).

An external prime converter is also found in the system of the present invention. The external prime converter receives the table of sequential counts from the processor and converts the table of sequential counts into a sequential set of human readable values representing measurements of the environmental parameter. The external prime converter may be a personal computer, a hand held computer device, or similar items. The prime converter, thus, converts the machine readable values into ones which are understandable by a human. In this regard, the prime converter includes a display which may be visually acquired by a human. In a addition, the history of measurements of the environmental parameter may be easily stored in the external prime converter for later reference and use.

It may be apparent that a novel and useful system for gathering and presenting environmental data has been hereinabove described.

It is therefore an object of the present invention to provide a system for gathering and presenting environmental data which utilizes a data logger which includes an ability to only sense an environmental parameter and convert the same into signals which are used by a external prime converter to present the same in a human readable form.

Another object of the present invention is to provide a system for gathering and presenting environmental data which includes a data logger or censer which has adequate power to execute tasks producing data signal and which may be calibrated quickly and efficiently.

Another object of the present invention is to provide a system for gathering and presenting environmental data which include a data logger which does not process human readable values.

A further object of the present invention is to provide a system for gathering and presenting environmental data which utilizes a data logger producing machine readable signals which may be coupled to an external prime converter in various forms such as PC's, palm pilots, cell phones, and the like.

A further object of the present invention is to provide a system for gathering and presenting environmental data which utilizes a data logger sensor which is compact and capable of handling multiple inputs.

Yet another object of the present invention is to provide a system for gathering and presenting environmental data which employs a data logger having a high resolution factor.

Another object of the present invention is to provide system for gathering and presenting environmental data which uses a censor in the form of a data logger that is capable of looking up data at smaller intervals and, thus, achieves an higher degree of accuracy than data loggers in the prior art.

Yet another object of the present invention is to provide a system for gathering and presenting environmental data which includes a data logger that may be programmed with internal diagnostics, which eliminates quality control inspections for such data logger unit.

The invention possesses other objects and advantages especially as concerns particular characteristics and features thereof which will become apparent as the specification continues.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
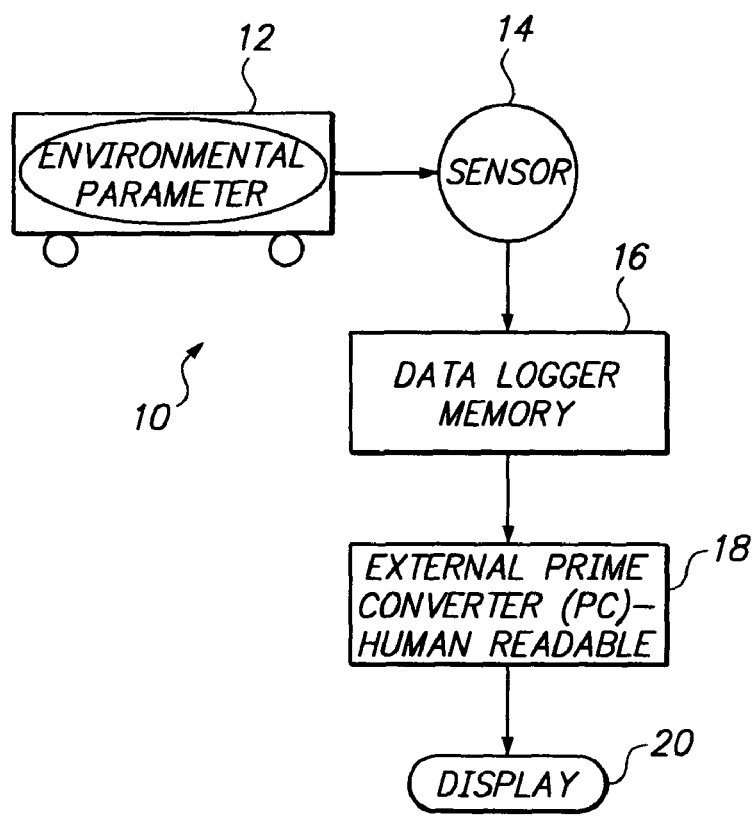
FIG. 1 is a flow diagram showing the overall system of the present invention.

An embodiment of the invention as a whole is shown in the drawing in reference character 10. System 10 gathers environmental data and presents the same to a human user. In this regard, FIG. 1 shows a vehicle 12, in schematic format. Vehicle 12 may carry perishable goods which must be maintained at, say, a certain temperature range during transit from one point to another, in order to prevent spoilage of the same. In this regard, sensor 14 of the present invention detects values of temperature within vehicle 12 at one or more points therewithin. sensor 14 produces a plurality of signals representative of such measurements and passes the same to a data logger memory 16. It should be noted that sensor 14 and data logger memory 16 may constitute a single unit. The signals representative of the data logger measurements are not converted into human readable form but are passed to an external prime converter 18, such as a computer, which displays and stores the values of the environmental parameters taken by sensor 14. Such receipt of the signals by the external prime converter 18 from the data logger memory 16 may take place instantly or at a later time. In addition, such signals may be transmitted by radio frequency, as the case may be. External prime converter 18 is normally located remotely with respect to data logger 22.

Figure 2:
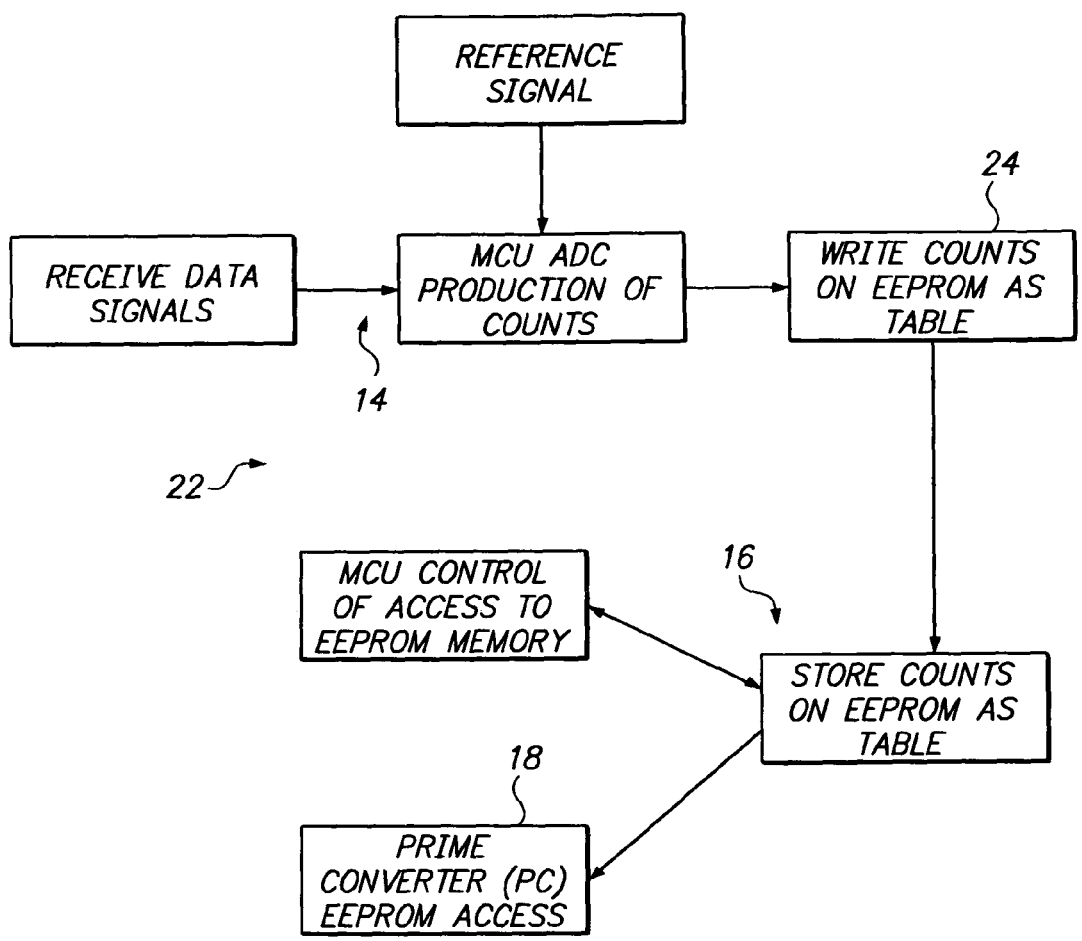
FIG. 2 is a flow diagram indicating the data logger function portion of the present invention in relation to the prime converter.

FIG. 2 indicates the function of sensor 14 and data logger memory unit 16 which combine to form a data logger 22. As may be apparent from FIG. 2, sensor 14 receives data signals and compares the same to a reference signal. The microprocessor (MCU) include an analog-to-digital converter (ADC) to produce a plurality of counts. Such counts are written on an electronically erasable programmable read only memory (EEPROM) 24 the microprocessor control unit(MCU) has access to the EEPROM 24. In addition, the prime external converter 18 has EEPROM access in order to receive the table of counts from the EEPROM 24 in order to produce a human readable version of such table of counts.

Figure 3:
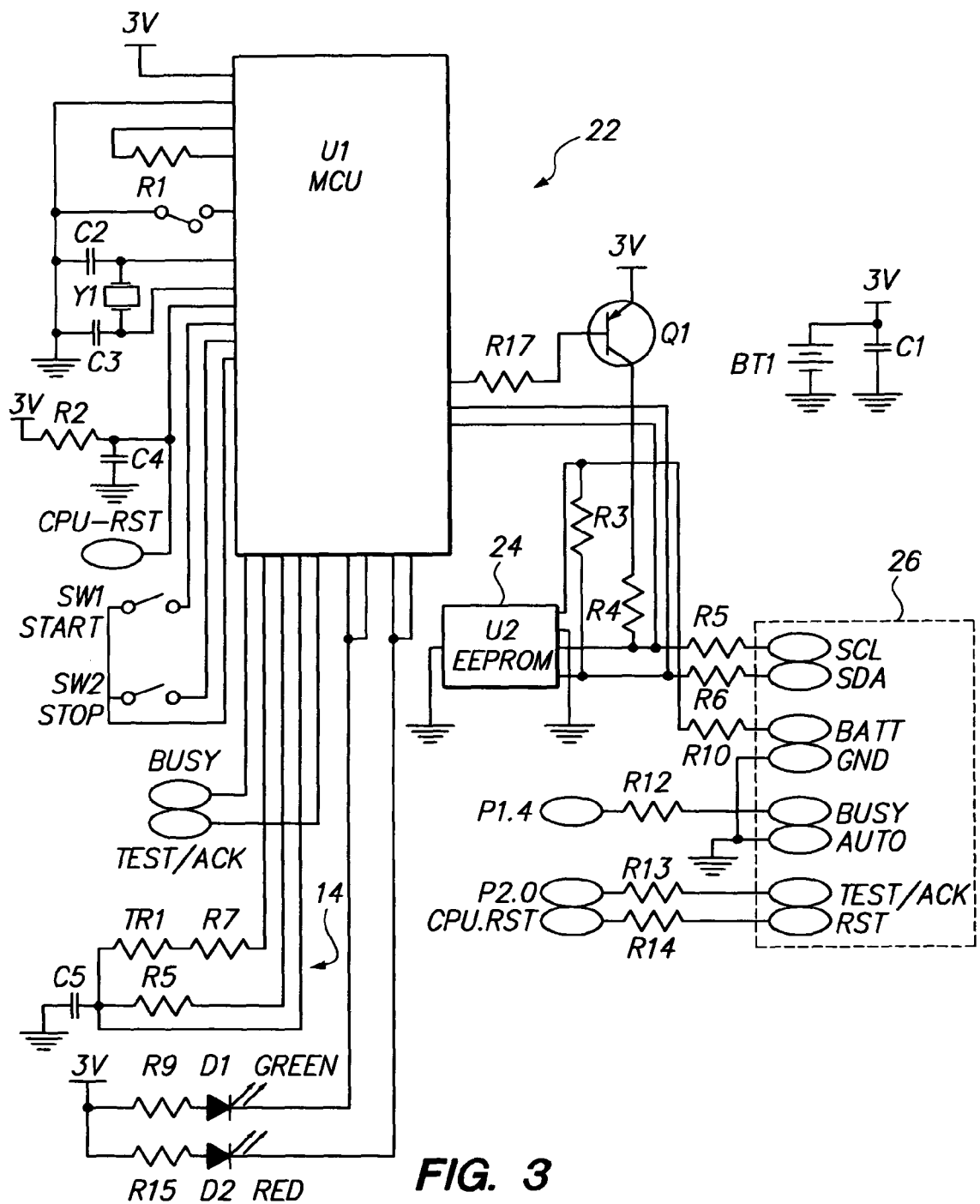
FIG. 3 is a schematic of the data logger portion of the system of the present invention.

With reference to FIG. 3, it may be observed that an electrical schematic is shown which represents the functioning of sensor 14, U2 EEPROM 24, and MCU U1, of the data logger unit 22. Sensor 14, via TR1 and R7, takes a measurement of an environmental parameter such as the temperature within vehicle 12, FIG.1. Circuit components C5 and R5 serve as a reference for such measurement taking. An analog-to-digital converter within MCU U1 compares the measurement taken by sensor 14 to a reference signal and produces data signals in the form of counts. The counts are then written in a processor U1 via U2 EEPROM 24, as data samples. The bus serving as a memory access to U2 EEPROM 24 to MCU U1 is controlled by resistor Q1. Memory in U2 EEPROM 24 is accessed from the outside at the SDA and SCL ports in junction box 26. In other words, the external prime converter 18 connects to data logger 22 in this manner. In addition, the U2 EEPROM 24 memory, also accessed by MCU U1, is tuned by resistors R3, R4, and R11. D1 and D2 serve as alarms. When D1 produces a visual signal, it begins to blink and logging begins. D2 may serve as an error indicator to stop such logging. Switches SW1 and SW2 permit the manual starting and stopping of data logger 22. BT1 comprises a three volt lithium coin battery which powers the system of data logger 22. Other output ports shown in output box 26 include BATT (battery), GRD (ground), BUSY (busy signal) and a AUTO (acknowledge). Such ports, as heretofore described, normally go to the external prime converter 18 depicted in FIGS.1 and 2. Y1 serves as the crystal (CLOCK) for MCU U1.

Following table represents typical information and values of the components found in FIG. 3.

TABLE OF COMPONENTS

| ITEM | VALUE |
|---|---|
| R1, R11 | 47 Kohm |
| R2, R5, R6, R10, R12, R13, R14-100 | Kohm |
| R3, R4 | 10 Kohm |
| R7 | 2 Kohm 0.5% |
| R8 | 100 Kohm 0.5% |
| R9 | 2K2 |
| R15 | 3K3 |
| TR1 | 104FF |
| C1, C4 | 0.1 mf |
| C2, C3 | 15 pf |
| C5 | 0.2 mf |
| Q-7 | PNP |
| Y-1 | 32 768 Hz |
| U-1 | 53c 9234 |
| U-2 | EEPROM 24 LC 64 |
| BT1 | 3 V |
| D1 | Green ALARM |
| D2 | Red ALARM |

Also, it should be noted that a software program may be employed to program EEPROM 24 for use as a data logger in system 10. A machine readable set of CD's accompany this application to indicate and illustrate the workability of such software program.

A operation, sensor 14 is used to detect an environmental parameter of the interior of vehicle 12 such as temperature, humidity, pressure, and the like sensor 14 produces a plurality of signals representative of such measurement. A processor in a form of EEPROM 24 receives a plurality of signals from the sensor 14 and produces a table of counts in sequential order. The external prime converter 18, usually in the form of a PC, receives the table of sequential counts from the processor EEPROM and converts the same into human readable values which are found on display 20 as such as the screen of a PC.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A system for gathering and presenting environmental data comprising:
   a. a sensor, said sensor obtaining a plurality of measurements of an environmental parameter and generating a plurality of analog signals representative of said measurements;
   b. a microprocessor control unit, said microprocessor control unit receiving said plurality of analog signals, converting said plurality of analog signals to digital signals, and producing a plurality of counts, said plurality of counts only being machine readable;
   c. a storage unit for storing said plurality of counts and producing a table of sequential counts, said table of sequential counts only being machine readable, said sensor, microprocessor control unit, and storage unit forming a data logger unit without a human readable display;
   d. an external prime converter, said external prime converter being physically located remotely from said data logger unit said external prime converter receiving said table of sequential counts, from microprocessor control unit of said data logger unit and converting said table of sequential counts to a sequential set of human readable values.

2. The system of claim 1 which said microprocessor control unit additionally comprises an analog-to-digital converter receiving said plurality of sensor analog signals.

3. The system of claim 1 in which said plurality of sensor analog signals comprises values of electrical resistance.

4. The system of claim 1 in which said storage unit further comprises an electronically erasable programmable read only memory unit.

5. The system of claim 3 which said microprocessor control unit additionally comprises an analog-to-digital converter receiving said plurality of sensor analog signals.

6. The system of claim 3 which said microprocessor control unit additionally comprises an analog-to-digital converter receiving said plurality of sensor analog signals.

* * * * *